United States Patent
Stent et al.

(10) Patent No.: US 11,042,994 B2
(45) Date of Patent: Jun. 22, 2021

(54) SYSTEMS AND METHODS FOR GAZE TRACKING FROM ARBITRARY VIEWPOINTS

(71) Applicants: TOYOTA RESEARCH INSTITUTE, INC., Los Altos, CA (US); Massachusetts Institute of Technology, Cambridge, MA (US)

(72) Inventors: Simon Stent, Cambridge, MA (US); Adria Recasens, Cambridge, MA (US); Antonio Torralba, Cambridge, MA (US); Petr Kellnhofer, Cambridge, MA (US); Wojciech Matusik, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 16/158,831

(22) Filed: Oct. 12, 2018

(65) Prior Publication Data
US 2019/0147607 A1    May 16, 2019

Related U.S. Application Data

(60) Provisional application No. 62/586,738, filed on Nov. 15, 2017.

(51) Int. Cl.
*G06K 9/00*    (2006.01)
*G06T 7/292*    (2017.01)
(Continued)

(52) U.S. Cl.
CPC ............. *G06T 7/292* (2017.01); *G06F 3/013* (2013.01); *G06N 3/084* (2013.01); *G06N 5/046* (2013.01);
(Continued)

(58) Field of Classification Search
CPC ......... G06T 7/292; G06T 7/246; G06F 3/013; G06N 3/084; G06N 5/046; H04N 5/23229; H04N 5/23293; H04N 5/247
(Continued)

(56) References Cited

U.S. PATENT DOCUMENTS 8,888,287 B2    11/2014    Yahav
9,329,683 B2    5/2016    Ebisawa
(Continued)

FOREIGN PATENT DOCUMENTS

CA    2750287 C    7/2012

OTHER PUBLICATIONS

B. Ahn, J. Park and I. Kweon, "Real-time head orientation from a monocular camera using deep neural network." In ACCV, 2014.
(Continued)

*Primary Examiner* — Stephen P Coleman
(74) *Attorney, Agent, or Firm* — Dinsmore & Shohl LLP

(57)    ABSTRACT

A system for determining the gaze direction of a subject includes a camera, a computing device and a machine-readable instruction set. The camera is positioned in an environment to capture image data of head of a subject. The computing device is communicatively coupled to the camera and the computing device includes a processor and a non-transitory computer-readable memory. The machine-readable instruction set is stored in the non-transitory computer-readable memory and causes the computing device to: receive image data from the camera, analyze the image data using a convolutional neural network trained on an image dataset comprising images of a head of a subject captured from viewpoints distributed around up to 360-degrees of head yaw, and predict a gaze direction vector of the subject based upon a combination of head appearance and eye appearance image data from the image dataset.

20 Claims, 10 Drawing Sheets

(51) Int. Cl.
    G06F 3/01    (2006.01)
    G06T 7/246    (2017.01)
    G06N 3/08    (2006.01)
    H04N 5/247    (2006.01)
    G06N 5/04    (2006.01)
    H04N 5/232    (2006.01)

(52) U.S. Cl.
    CPC ......... *G06T 7/246* (2017.01); *H04N 5/23229* (2013.01); *H04N 5/23293* (2013.01); *H04N 5/247* (2013.01); *G06T 2207/30196* (2013.01)

(58) Field of Classification Search
    USPC .......................................................... 382/103
    See application file for complete search history.

(56) References Cited

U.S. PATENT DOCUMENTS

| | | | |
|---|---|---|---|
| 9,411,417 B2 | 8/2016 | Arar et al. | |
| 10,027,888 B1* | 7/2018 | Mackraz | G06K 9/00228 |
| 2007/0121066 A1* | 5/2007 | Nashner | A61B 3/028 |
| | | | 351/210 |
| 2010/0033333 A1* | 2/2010 | Victor | A61B 3/113 |
| | | | 340/576 |
| 2012/0014501 A1* | 1/2012 | Pelc | A61B 6/025 |
| | | | 378/9 |
| 2012/0293632 A1* | 11/2012 | Yukich | H04N 5/247 |
| | | | 348/47 |
| 2015/0189310 A1* | 7/2015 | Jeong | H04N 19/513 |
| | | | 375/240.16 |
| 2016/0247272 A1* | 8/2016 | Nishino | G06K 9/00604 |
| 2016/0334869 A1 | 11/2016 | Zhang et al. | |
| 2017/0116476 A1 | 4/2017 | Publicover et al. | |
| 2017/0178345 A1* | 6/2017 | Pham | G06T 7/277 |
| 2017/0363949 A1* | 12/2017 | Valente | H04N 13/344 |
| 2018/0225554 A1* | 8/2018 | Tawari | G06K 9/624 |

OTHER PUBLICATIONS

M. Demirkus, D. Precup, J. J. Clark and T. Arbel. "Heirarchial temporal graphical model for head pose estimation and subsequent attribute classification in real-world videos." CVIU, 2015.
A. Doshi and M. M. Trivedi. On the roles of eye gaze and head dynamics in predicting driver's intent to change lanes. IEEE Transactions on Intelligent Transportation Systems, 10(3): 453-461, 2009.
A. Gibaldi, M. Vanegas, P. J. Bex and G. Maiello. "Evaluation of the Tobii eyex eye tracking controller and matlab toolkit for research," Behavior Research Materials, 49(3): 923-946, Jun. 2017.
E. D. Guestrin and M. Eizenman. "General theory of remote gaze estimation using the pupil center and corneal reflections." IEEE Transactions on biomedical engineering, 53(6): 1124-1133, 2006.
C. Hennessey, B. Noureddin and P. Lawrence, "A single camera eye gaze tracking system with free head motion." In ETRA, 2006.
C. M. Huang and A. L. Thomas, "Joint attention in human-robot interaction." In 2010 AAAI Fall Symposium, 2010.
G. Huang, Z. Liu, L. Van der Maaten and K. Q. Weinberger, "Densely connected convolutional networks." In Proceedings of the IEEE Conference on Computer Vision and Pattern Recognition, 2017.
M. X. Huang, J. Li, G. Ngai and H. V. Leong, "Screenglint: Practical, in-situ gaze estimation on smartphones." In Poceedings of the 2017 CHI Conference on Human Factors in Computing Systems, CHI '17, pp. 2546-2557, New York, NY, USA, 2017, ACM.
Q. Huang, A. Veeraraghavan and A. Sabharwal, "Tabletgaze: unconstrained appearance-based gaze estimation in mobile tablets." Machine Vision and Applications, 28(5): 445-41, Aug. 2017.
R. Jacob and K. S. Karn, "Eye tracking in human-computer interaction and usability research: Ready to deliver the promises." Mind, 2003.

H. Ji, F. Su and Y. Zhu, "Robust head pose estimation via semi-supervised manifold learning with 11-graph regularization." In IJCB, 2011.
A. Kar and P. Corcoran, "A review and analysis of eye-gaze estimation systems, algorithms and performance evaluation methods in consumer platforms." IEEE Access, 5:16495-16519, 2017.
A. Khosla, K. Krafka, P. Kellnhofer, H. Kannan, S. Bhandarkar, W. Matusik and A. Torralba, "Eye tracking for everyone." In IEEE Conference on Computer Vision and Pattern Recognition (CVPR), Las Vegas, USA, Jun. 2016. indicates equal contribution.
D. Kingma and J. Ba, "Adam: A method for scholastic optimization." In International Conference on Learning Representations (ICLR), 2014.
A. Krizhevsky, I. Sutskever and G. E. Hinton, "Imagenet classification with deep convolutional neural networks." In NIPS, 2012.
D. G. Lowe, "Distinctive image features from scale-invariant keypoints." International Journal of Computer Vision, 60(2): 91-110, 2004.
M.J. Marin-Jimenez, A. Zisserman and V. Ferrari, "Here's looking at you, kid." Detecting People Looking at Each Other in Videos. In BMVC, 5, 2011.
P.M.R.Martin Kostinger, Paul Wohlhart and H. Bischof, Annotated Facial Landmarks in the Wild: A Large-Scale, Real-world Database for Facial Landmark Localization. In Proc. First IEEE International Workshop on Benchmarking Facial Image Analysis Technologies, 2011.
C.D. McMurrough, V. Metsis, J. Rich and F. Makedon, "An eye tracking dataset for point of gaze detection." In ETRA, 2012.
K.A.F. Mora, F. Monay and J.M. Odobez, "EYEDIAP: A database for the development and evaluation of gaze estimation algorithms from rgb and rgb-d cameras." ETRA, 2014.
E. Murphy-Chutorian and M.M. Trivedi, "Head pose estimation in computer vision: A survey." IEEE Transactions on Patter Analysis and Machine Intelligence, 2009.
M. Patacchiola and A. Cangelosi, "Head pose estimation in the wild using convolutional neural networks and adaptive gradient methods." Pattern Recognition, 2017.
A. Rasouli, I. Kotseruba and J.K. Tostsos, "Agreeing to cross: How drivers and pedestrians communicate." In IEEE Intelligent Vehicles Symposium (IV), 2017.
A. Recasens, A. Khosla, C. Vondrick and A. Torralba, "Where are they looking?" In Advances in Neural Information Processing Systems (NIPS), 2015.
A. Recasens, C. Vondrick, A. Khosla and A. Torralba, "Following gaze in video." In Proceedings of the IEEE Conference on Computer Vision and Pattern Recognition, pp. 1435-1443, 2017.
A. Shrivastaba, T. Pfister, O. Tuzel, J. Susskind, W. Wang and R. Webb, "Learning from simulated and unsupervised images through adversarial training." arXiv preprint arXiv: 1612.07828, 2016.
B.A. Smith, Q. Yin, S.K. Feiner and S.K. Nayar, "Gaze locking: Passive eye contact eye detection for human object interaction." In UIST, 2013.
Y. Sugano, Y. Matsushita and Y. Sato, "Learning-by-synthesis for appearance-basaed 3d gaze estimation." In CVPR, 2014.
K. Sundararajan and D.L. Woodand, "Head pose estimation in the wild using approximate view manifolds." In 2015 IEEE Conference on Computer Vision and Pattern Recognition Workshops (CVPRW), 2015.
V. Venkatraman, A. Dimoka, P.A. Pavlou, K. Vo. W. Hampton, B. Bollinger, H.E. Hershfield, M. Ishihara and R.S. Winer, "Predicting advertising success beyond traditional measures: New insights from neurophysiological methods and market response modeling." Journal of Marketing Research, 52(4): 436-452, 2015.
K. Wang and Q. Ji, "Real time eye gaze tracking with 3d deformable eye-face model." In IEEE International Conference on Computer Vision (ICCV), Oct. 2017.
U. Weidenbacher, G. Layher, P.M. Strauss and H. Neumann, "A comprehensive head pose and eye gaze database." 2007.
L. Wolf, T. Hassner and I. Maoz, "Face recognition in unconstrained videos with matched background similarity." In CVPR, 2011.
E. Wood, T. Baltrusaitis, L.P. Mahoney, P. Robinson and A. Bulling, "Learning an appearance-based gaze estimator from one million

(56) References Cited

OTHER PUBLICATIONS synthesised images." In Proceedings of the Ninth Biennial ACM Symposium on Eye Tracking Research & Applications, pp. 131-138, ACM, 2016.

C. Wu, "Towards linear-time incremental structure from motion." In 3DTV-Conference, 2013 International Conference on, pp. 127-13. IEEE, 2013.

P. Xu, K.A. Ehinger, Y. Zhang, A. Finklestein, S.R. Kulkarni and J. Xiao, "Turkergaze: Crowdsourcing saliency with webcam based eye tracking" arXiv: 1504.06755, 2015.

D.H. Yoo and M.J. Chung, "A novel non-intrusive eye gaze estimation using cross-ratio under large head motion." CVIU, 2005.

X. Zhang, Y. Sugano, M. Fritz and A. Bulling, "Appearance-based gaze estimation in the wild." In CVPR, 2015.

X. Zhang, Y. Sugano, M. Fritz and A. Bulling, "It's written all over your face: Full-face appearance-based gaze estimation." In 2017 IEEE Conference on Computer Vision and Pattern Recognition Workshops, CVPR Workshop, Honolulu, HI, USA. Jul. 21-26, 2017, pp. 2299-2308, 2017.

H. Zhao, J. Shi, X. Qi, X. Wang and J. Jia, "Pyramid scene parsing network." In Proceedings of IEEE Conference on Computer Vision and Pattern Recognition (CVPR), 2017.

B. Zhou, A. Lapedriza, J. Xiao, A. Torralba and A. Oliva, "Learning deep features for scene recognition using places database." In Advances in neural information processing systems, pp. 4f87-495, 2014.

W. Zhu and H. Deng, "Monocular free-head 3d gaze tracking with deep learning and geometry constraints." In The IEEE International Conference on Computer Vision (ICCV), Oct. 2017.

X. Zhu and D. Ramanan, Face detection, pose estimation and landmark localization in the wild. In CVPR, pp. 2879-2886, 2012.

Z. Zhu and Q. Ji, "Eye gaze tracking under natural head movements." In CVPR, 2005.

"MPIIGaze: Real-world dataset and deep appearance-based gaze estimation," https://arxiv.org/pdf/1711.09017.pdf, Published/Accessed: Dec. 12, 2017.

Gaze-tracking in wide area using multiple camera observations, https://dl.acm.org/citation.cfm?doid=2168556.2168614, Published/Accessed: Dec. 12, 2017.

* cited by examiner

SYSTEMS AND METHODS FOR GAZE TRACKING FROM ARBITRARY VIEWPOINTS

CROSS-REFERENCE TO RELATED APPLICATIONS

This application claims the benefit of U.S. Provisional Application No. 62/586,738, entitled "SYSTEMS AND METHODS FOR GAZE TRACKING FROM EVERYWHERE," filed Nov. 15, 2017, the entirety of which is hereby incorporated by reference.

TECHNICAL FIELD

The present specification generally relates to systems and methods for determining a gaze direction of a subject and, more specifically, to systems and methods for determining a gaze direction of a subject from arbitrary viewpoints when the eye of a subject becomes self-occluded from an eye-tracker.

BACKGROUND

Vision is the primary sense with which we perceive the surrounding world. By analyzing where a subject is looking, or in other words tracking the gaze or fixation of a subject, it is possible to learn about the attention, intention, and possible future actions of the subject.

There are two common systems for tracking the gaze of a person. First, through the use of dedicated devices, such as cameras positioned to view corneal reflections created from near-infrared light emitters that are positioned to illuminate the eye of the subject, the gaze of the subject may be determined. However, these systems are limited in that the subject's position (e.g., their eyes) must remain in view of both the detectors (e.g., the camera) and the light emitters to produce accurate tracking results. Second, wearable trackers are available, but are more intrusive and generally result in low performance. Therefore, to currently track a subject's gaze, the subject must either wear a device or stay within a relatively small tracking envelope, i.e., in the field of view of both the emitters and detectors.

Accordingly, a need exists for alternative systems and methods for determining the gaze direction of a subject from arbitrary viewpoints when the eye of a subject becomes self-occluded from an eye-tracker.

SUMMARY

In one embodiment, a system may include a camera, a computing device and a machine-readable instruction set. The camera may be positioned in an environment to capture image data of a head of a subject. The computing device may be communicatively coupled to the camera and the computing device has a processor and a non-transitory computer-readable memory. The machine-readable instruction set may be stored in the non-transitory computer-readable memory and causes the computing device to perform at least the following when executed by the processor: receive the image data from the camera, analyze the image data captured by the camera using a convolutional neural network trained on an image dataset comprising images of the head of the subject captured from viewpoints distributed around up to 360-degrees of head yaw, and predict a gaze direction vector of the subject wherein when an eye or eyes of the subject are captured in the image data by the camera the prediction is based upon a combination of a head appearance and an eye appearance from the image dataset and when the eyes are occluded in the image data, the prediction is based upon the head appearance.

In another embodiment, a system may include an eye-tracker, a display, a plurality of cameras, a computing device and a machine-readable instruction set. The eye-tracker may be positioned at a front facing viewpoint, where the eye-tracker captures eye-tracking image data of an eye of a subject. The display may be positioned to project a target image to the subject. The plurality of cameras may be positioned to capture image data of a head of the subject, where the image data comprises a set of synchronized images from the front facing viewpoint to a rear facing viewpoint about 180-degrees of head yaw. The computing device may be communicatively coupled to the plurality of cameras and the computing device has a processor and a non-transitory computer-readable memory. The machine-readable instruction set may be stored in the non-transitory computer-readable memory and causes the system to perform at least the following when executed by the processor: project the target image at a location on the display, synchronously capture image data of the head of the subject from the plurality of cameras and the eye-tracking image data from the eye-tracker, and periodically adjust the location of the target image on the display. The machine-readable instruction set may further cause the processor to determine an eye-tracker gaze direction vector of the subject from the eye-tracking image data, and store the image data from the plurality of cameras and the eye-tracking image data from the eye-tracker in the non-transitory computer-readable memory, thereby forming an image dataset comprising images of the subject from the front facing viewpoint to the rear facing viewpoint about at least 180-degrees of head yaw.

In yet another embodiment, a method may include obtaining training data for training a convolutional neural network including the steps of displaying a target image at a location on a display positioned in front of a subject, synchronously capturing image data of the subject from a plurality of cameras positioned to capture image data of head of the subject from a front facing viewpoint to a rear facing viewpoint about 180-degrees of head yaw and eye-tracking image data from an eye-tracker, and periodically adjusting the location of the target image on the display. The method may further include determining an eye-tracker gaze direction vector of the subject from the eye-tracking image data, and storing the image data from the plurality of cameras and the eye-tracking image data from the eye-tracker in a non-transitory computer-readable memory thereby forming an image dataset comprising images of the subject from the front facing viewpoint to the rear facing viewpoint about at least 180-degrees of head yaw.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein include systems and methods for determining gaze direction of a subject from arbitrary viewpoints. That is, the systems and methods described herein may be capable of determining a gaze direction of a subject regardless of whether the subject's face and/or eyes are viewable by the detection portion of the system, for example, a camera. By blending between reliance on eye appearance to reliance on head and/or body position, the systems and methods described herein are capable of determining the gaze direction of the subject. In other words, as the eyes and/or facial features of a subject become self-occluded from view by the camera implemented to capture image data of the subject, the system transitions from reliance on the eyes and facial features to reliance on head and body position for determining the gaze direction of the subject. As used herein, "self-occluded" refers to instances, for example, where a portion of the subject (e.g., their head, a hat, or glasses) occludes their eyes from view of a camera implemented to determine the gaze direction the subject.

Some embodiments described herein utilize a convolutional neural network trained with an image dataset including images from 360-degrees of head yaw obtained by a multi-camera acquisition setup such that a gaze direction vector may be predicted by the convolutional neural network independent of the viewpoint of an image so long as the image captures at least the head of a subject. As described in more detail herein, systems may include a camera for capturing image data of a subject including but not limited to the eyes and head of the subject. The image data may be analyzed using a convolutional neural network trained with images from viewpoints about 360-degrees of head yaw. The convolutional neural network may further be configured to generate an output that regresses an input image to a three-dimensional gaze vector representing a predicted gaze direction vector of the subject. The image dataset, referred to herein as "the Gaze360 dataset," may include sets of synchronized images captured by multiple cameras extending from a front facing viewpoint to a rear facing viewpoint about 180-degrees of head yaw. Each of the images may be spatially located with respect to an eye-tracking gaze vector determined from an eye-tracking system and a geometrically corrected gaze vector for each image may be generated based on the eye-tracking gaze vector. The geometrically corrected gaze vector may be utilized during training of the convolutional neural network as a correction (or right answer) to the predicted output (i.e., predicted gaze direction vector) of the convolutional neural network when determining the error of the predicted output. Through backpropagation, the error adjusts the predicted output to more closely approximate the geometrically corrected gaze vector until the convolutional neural network settles into or approaches a minimum error state.

Figure 1:
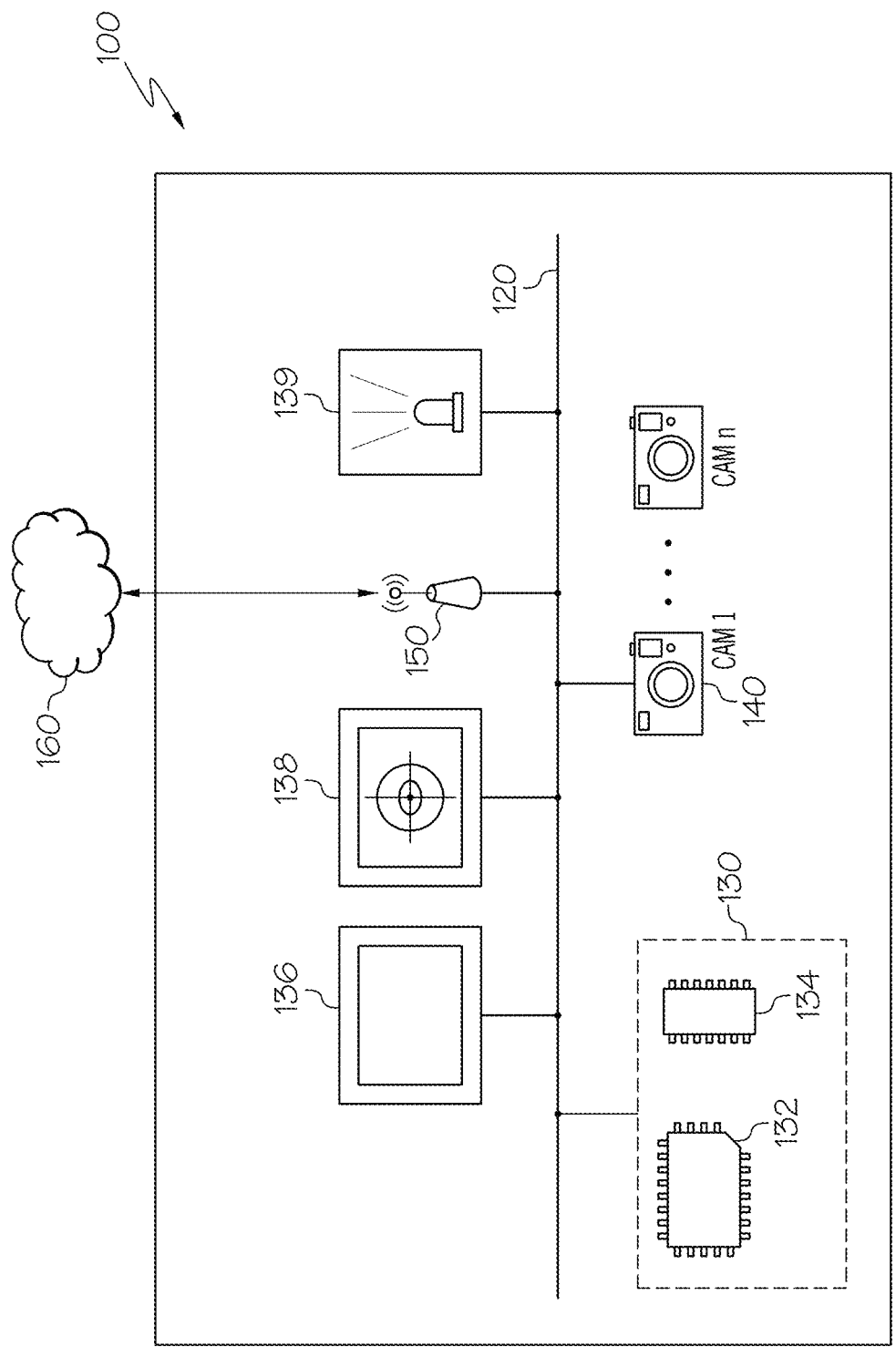
FIG. 1 depicts a system for determining the gaze direction of a subject from arbitrary viewpoints according to one or more embodiments shown and described herein.

Turning now to the drawings wherein like numbers refer to like structures, and particularly to FIG. 1, a system 100 for determining a gaze-direction of a subject is depicted. In some embodiments, the system 100 may be employed in a training mode, that is to train a convolutional neural network, or in an application mode to capture image data and determine a gaze direction of a subject captured in the image data. The system 100 generally includes a communication path 120, a computing device 130 comprising a processor 132 and a non-transitory computer-readable memory 134, a display 136, an eye-tracking system 138, an infrared-emitter 139, one or more cameras 140, and network interface hardware 150. The system 100 may be communicatively coupled to a network 160 by way of the network interface hardware 150. The components of the system 100 may be physically coupled or may be communicatively and operably coupled through the communication path 120 and/or the network 160. The various components of the system 100 and the interaction thereof will be described in detail herein.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors 132, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 1, the computing device 130 may be any device or combination of components comprising a processor 132 and non-transitory computer-readable memory 134. The processor 132 of the system 100 may be any device capable of executing the machine-readable instruction set stored in the non-transitory computer-readable memory 134. Accordingly, the processor 132 may be an electric controller, an integrated circuit, a microchip, a computer, or any other computing device. The processor 132 may be communicatively coupled to the other components of the system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer-readable memory 134 of the system 100 is coupled to the communication path 120 and communicatively coupled to the processor 132. The non-transitory computer-readable memory 134 may comprise RAM, ROM, flash memories, hard drives, or any non-transitory memory device capable of storing a machine-readable instruction set such that the machine-readable instruction set can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer-readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer-readable memory 134, other embodiments may include more than one memory module.

The system 100 comprises a display 136 for providing a visual output, for example, to project a target image to a subject. The display 136 is coupled to the communication path 120. Accordingly, the communication path 120 communicatively couples the display 136 with other modules of the system 100. The display 136 may include any medium capable of transmitting an optical output such as, for example, a cathode ray tube, light emitting diodes, a liquid crystal display, a plasma display, or the like. Additionally, the display 136 may be the display 136 of a portable personal device such as a smart phone, tablet, laptop or other electronic device. Furthermore, the display 136 may be a television display mounted on a stand or on a wall to project target images (e.g., a single colored shape, such as a white circle) to a subject at a specified distance. Additionally, it is noted that the display 136 can include one or more processors 132 and one or more non-transitory computer-readable memories 134. While the system 100 includes a display 136 in the embodiment depicted in FIG. 1, the system 100, for example, in an application mode, may not include a display 136. That is, a display 136 may only be necessary while the system 100 is configured in the training mode.

Still referring to FIG. 1, the system 100 may include an eye-tracking system 138 for tracking an eye of a subject to generate an eye-tracking gaze direction vector for training the convolutional neural network. The eye-tracking system 138 may include a camera or an array of infrared light detectors positioned to view one or more eyes of a subject. The eye-tracking system 138 may also include or be communicatively coupled to an infrared or near-infrared light emitter 139. The infrared or near-infrared light emitter 139 may emit infrared or near-infrared light, which may be reflected off a portion of the eye creating a profile that is more readily detectable than visible light reflections off an eye for eye-tracking purposes.

The eye-tracking system 138 may be spatially oriented in an environment and generate an eye-tracking gaze direction vector. One of a variety of coordinate systems may be implemented, for example, a user coordinate system (UCS) may be used. The UCS has its origin at the center of the front surface of the eye-tracker. With the origin defined at the center of the front surface (e.g., the eye-tracking camera lens) of the eye-tracking system 138, the eye-tracking gaze direction vector may be defined with respect to the location of the origin. Furthermore, when spatially orienting the eye-tracking system 138 in the environment, all other objects including the one or more cameras 140 may be localized with respect to the location of the origin of the eye-tracking system 138. In some embodiments, an origin of the coordinate system may be defined at a location on the subject, for example, at a spot between the eyes of the subject. Irrespective of the location of the origin for the coordinate system, a calibration step, as described in more detail herein, may be employed by the eye-tracking system 138 to calibrate a coordinate system for collecting image date for training the convolutional neural network.

Still referring to FIG. 1, the system 100 may include one or more cameras 140. The one or more cameras 140 may be communicatively coupled to the communication path 120 and to the processor 132. The one or more cameras 140 may be any device having an array of sensing devices (e.g., pixels) capable of detecting radiation in an ultraviolet wavelength band, a visible light wavelength band, or an infrared wavelength band. The one or more cameras 140 may have any resolution. The one or more cameras 140 may be an omni-directional camera, or a panoramic camera. In some embodiments, one or more optical components, such as a mirror, fish-eye lens, or any other type of lens may be optically coupled to each of the one or more cameras 140. In embodiments described herein, the one or more cameras 140 may provide image data of a subject or the subject and the environment around the subject to the computing device 130. In training mode, that is when collecting image data for training a convolutional neural network, the one or more cameras 140 may be positioned at various locations to collect image data of a subject from various viewpoints, as described in more detail with respect to FIGS. 2A and 2B. In an application mode, one or more cameras 140 may be positioned in an environment, for example, a vehicle cabin, on a robot, or in a room to capture image data of a subject, optionally including their eyes and/or head to determine a gaze direction of the subject.

In operation, the one or more cameras 140 capture image data and transmit the image data to the computing device 130. The image data may be received by the processor 132, which may process the image data using one or more image processing algorithms. Any known or yet-to-be developed video and image processing algorithms may be applied to the image data in order to identify an item or determine a location of an item relative to other items in an environment. Example video and image processing algorithms include, but are not limited to, kernel-based tracking (mean-shift tracking) and contour processing algorithms. In general, video and image processing algorithms may detect objects and movement from sequential or individual frames of image data. One or more object recognition algorithms may be applied to the image data to estimate three-dimensional objects to determine their relative locations to each other. For example, structure from motion, which is a photogrammetric range imaging technique for estimating three-dimensional structures from image sequences, may be used. Additionally, any known or yet-to-be-developed object recognition algorithms may be used to extract the objects, edges, dots, bright spots, dark spots or even optical characters and/or image fragments from the image data. For example, object recognition algorithms may include, but are not limited to, scale-invariant feature transform ("SIFT"), speeded up robust features ("SURF"), and edge-detection algorithms.

The systems and methods described herein may be applied in two modes, first, in a training mode, and second, in an application mode. As used herein, the training mode refers to an environment configured to collect image data to generate an image dataset for training a convolutional neural network, which may predict a gaze direction vector of a subject. As used herein, the application mode refers to an environment where the system 100 is configured to collect image data for input into the convolutional neural network to predict a gaze direction vector of a subject. In such a mode, the convolutional neural network may already be trained or may be actively engaged in training while also functioning in an application environment. For example, the system 100 may be implemented in an application environment such as a vehicle cabin for determining what a driver is looking at or whether the drive is attentive to surroundings.

Figure 2A:
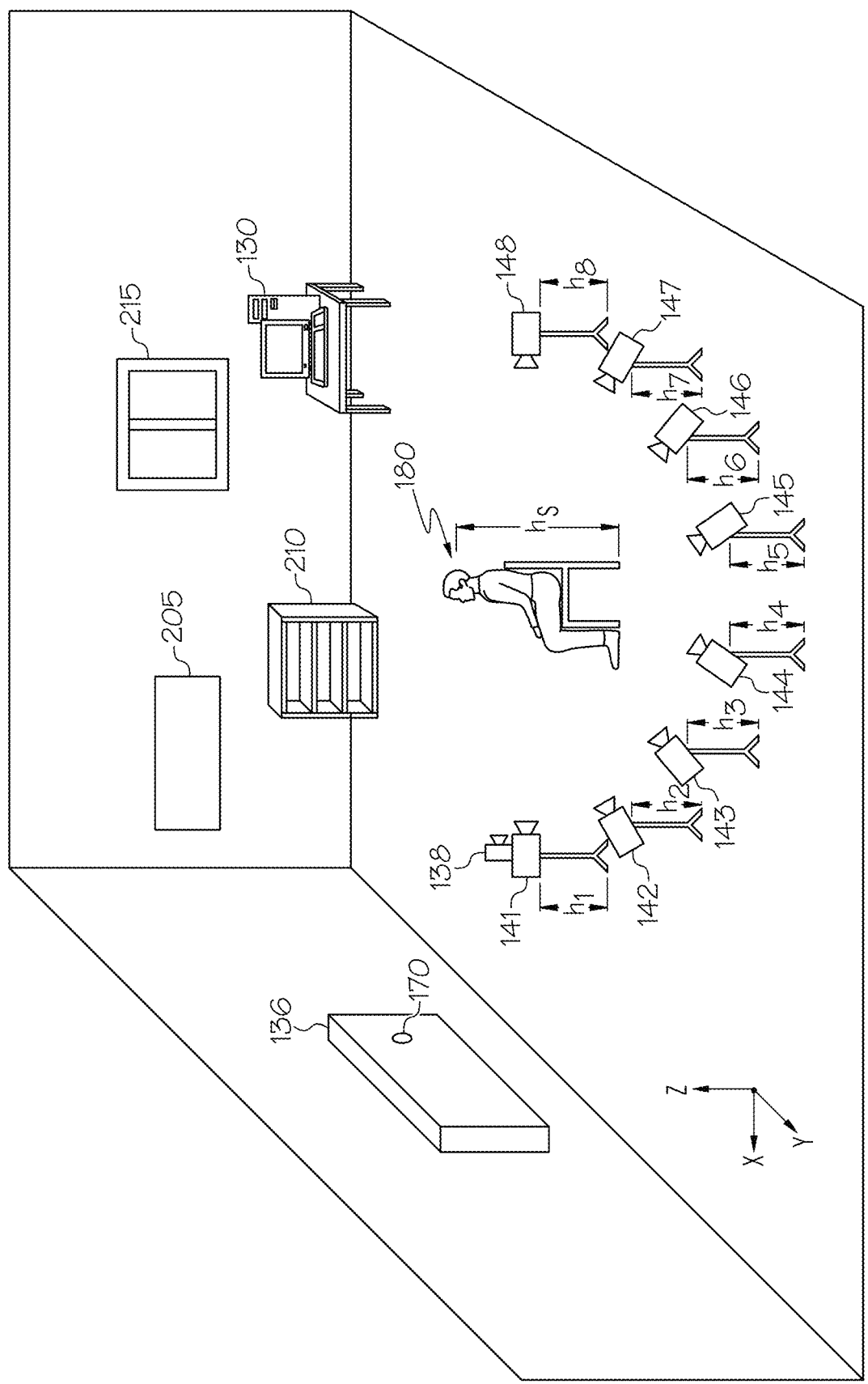
FIG. 2A depicts an illustrative environment of a system for collecting 3D gaze data for determining the gaze direction of a subject from arbitrary viewpoints according to one or more embodiments shown and described herein.
Figure 2B:
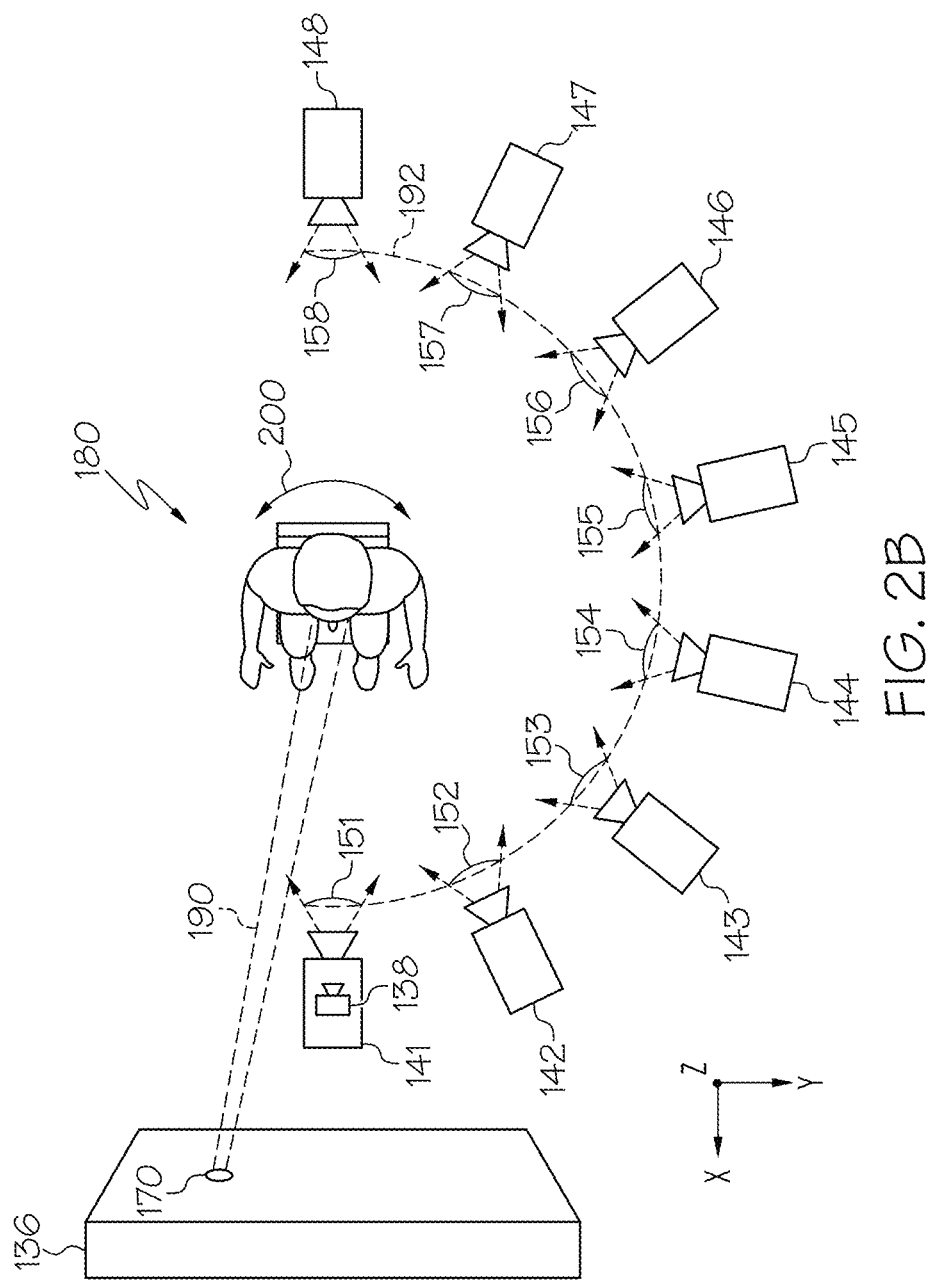
FIG. 2B depicts a top-down view of an illustrative environment of a system for collecting 3D gaze data for determining the gaze direction of a subject from arbitrary viewpoints according to one or more embodiments shown and described herein.

Referring now to FIGS. 2A and 2B, an illustrative environment implementing the system 100 is depicted. More specifically, FIG. 2A depicts an isometric view and FIG. 2B depicts a top-down view of an environment for collecting image data to generate the Gaze360 dataset. As depicted in FIGS. 2A and 2B, a plurality of cameras 141-148 (also referred to generally as cameras 140) surround a subject 180 in a half-ring 192 orientation (i.e., an orientation extending from a front facing viewpoint 151 to a rear facing viewpoint 158 about 180-degrees of head yaw 200). Each of the cameras 141-148 of the plurality of cameras 140 is positioned to capture a unique set of image data of the subject 180 from a unique viewpoint. As depicted in FIG. 2B, each of the cameras 141-148 have a field of view 151-158 respectively. The field of views 151-158 define a unique viewpoint for viewing the subject 180. For example, camera 141 is in a front facing viewpoint 151 to capture the face, eyes, and head of the subject 180 when the subject 180 is facing forward (i.e., when the subject 180 is facing the display 136 positioned at a distance from the subject 180 and in a front facing viewpoint 151 with respect to the subject 180). Conversely, for example, camera 148 is in a rear facing viewpoint 158, which captures a back of the head of the subject 180.

FIGS. 2A and 2B along with the description herein generally refer to a system 100 having eight cameras 141-148 for collecting image data of the subject 180 to generate the Gaze360 dataset. However, the system 100 may include fewer than eight cameras 140 or greater than eight cameras 140. The number of cameras 140 depends on the number required to capture image data of the subject 180 about at least 180-degrees of head yaw 200 from the face to the rear of the head of a subject 180. For example, the system 100 may include 2, 3, 4, 5, 6, 7, 8, 9, 10, 11, 12, or more cameras 140 so long as they are positioned to capture image data about at least 180-degrees of head yaw 200 from the face to the rear of the head of the subject 180. For example, the cameras 140 may be positioned about 180-degrees, 270-degrees, 360-degrees or any value there between of head yaw 200 from the face to the rear of the head of a subject 180. Although cameras 141-148 may be positioned about 180-degrees of head yaw 200 from a front facing viewpoint 151 to a rear facing viewpoint 158, the image data collected from those cameras 141-148 may be mirrored through the vertical plane (ZX-plane) to form a 360-degree of head yaw 200 image dataset (i.e., the Gaze360 dataset). This is possible because a human head (moreover, a human body) is generally symmetrical about the median plane or midsagittal plane.

Each of the cameras 141-148 of the plurality of cameras 140 may be positioned at a height $h_1$-$h_8$. Each height $h_1$-$h_8$ may be the same, different or may be a combination of matched and mismatched heights. By varying the height $h_1$-$h_8$ of the cameras 141-148, a more diverse dataset of images may be collected. For example, camera 141 may be positioned at a height $h_1$ where height $h_1$ is about 2 feet high and the head of the subject 180 is at a height $h_s$ of about 4 feet. Therefore, camera 141 may capture an image of the subject 180 from a viewpoint 151 with an upward angle (i.e., at an upward pitch angle). By way of another example, camera 141 may be positioned at a height $h_2$ where height $h_2$ is about 5 feet high and the head of the subject 180 is at a height $h_s$ of about 4 feet. Therefore, camera 142 may capture an image of the subject 180 from a viewpoint 152 with a downward angle (i.e., at a downward pitch angle). In some embodiments, the cameras 141-148 may capture up to 180-degrees of head pitch and/or up to 180-degrees of head roll.

As a non-limiting embodiment, the cameras 141-148 may be PointGrey Grasshopper2 2.0 megapixel RGB cameras in a half-ring 192 around the subject 180 each with a randomized height $h_1$-$h_8$. By using multiple cameras 141-148, many instances of head appearance may be acquired simultaneously.

Still referring to FIGS. 2A and 2B, a display 136 is positioned at a distance in front of the subject 180. For example, the display 136 may be an LCD display positioned at a distance of about 80 cm, 90 cm, 100 cm, 110 cm, 120 cm, 130 cm, 140 cm, 150 cm, 160 cm, 170 cm, 180 cm, 190 cm, or 200 cm, from the subject 180. These are only example distances and those skilled in the art may determine other distances. As such, a viewing angle of the display 136 by the subject 180 is achieved. For example, when the display 136 is about 140 cm from the subject 180 a viewing angle of about 47-degrees horizontally and 27-degrees vertically may be achieved. The display 136 is communicatively coupled to a computing device 130. The computing device 130 may generate a signal to cause the display 136 to project a target image 170 at a location on the display 136. In some embodiments, the computing device 130 may further cause the display 136 to adjust the location of the target image 170 periodically such that the subject 180 changes their gaze 190 to a different location on the display 136 following the target image 170 from location to location. The cameras 141-148 may be configured to simultaneously capture image data of the subject 180 while the display 136 projects the target image 170.

In some embodiments, the system 100 may also include an eye-tracking system 138. The eye-tracking system 138 may be positioned in a front facing viewpoint 151 to capture and track the motion of the gaze 190 of the subject 180 as the target image 170 is projected and moved from location to location on the display 136. In some embodiments, the eye-tracking system 138 may be coupled to camera 141. In some embodiments, the eye-tracking system 138 may be positioned separate from camera 141 at a height and distance from the subject 180. For example, the eye-tracking system 138 may be positioned about 60 cm in front of the subject 180 at a height equivalent to the bottom edge of the display 136. In some embodiments, the eye-tracking system 138 may be integrated with camera 141. That is, the camera 141 may operate as both a camera 141 for collecting image data of the subject 180 from a front facing viewpoint 151 as well as providing the system 100 (e.g., the computing device 130) with eye-tracking gaze direction vector information. In embodiments described herein, the gaze is recorded as an eye-tracking gaze direction vector, $g_0 \in \mathbb{R}^3$.

Referring specifically to FIG. 2A, the environment for collecting image data of the subject 180 while presenting the subject 180 with a target image 170 on the display 136 may include one or more objects positioned in the background. That is, the cameras 141-148 capturing image data of the subject 180 may also capture the objects in the background. As depicted in FIG. 2A, a picture 205, a bookcase 210, a window 215, the computing device 130, and the display 136 may be captured in the background of the image data of the subject 180 by one or more of the cameras 141-148. Since each of the height, pitch, and local yaw of each of the cameras 141-148 may be adjusted between image collection sequences to develop a diverse dataset, the cameras 141-148 may need to be located in a global reference frame. That is, to determine the gaze direction from the point of view 151-158 of each camera 141-148 a transformation between the individual cameras 141-148 and the eye-tracking system 138 may be needed. The viewpoints 151-158 for each of the cameras 141-148 may need to be determined each time the cameras 141-148 are adjusted. This may be accomplished by registering each camera 141-148 to a SIFT feature-based model using the image data of background objects captured within the view 151-158 of each camera 141-148. In some embodiments, the view 151-158 of one or more of the cameras 141-148 overlap such that background objects are common to one or more cameras 141-148. As such, the cameras 141-148 may be located within the environment based on their shared background images. In some embodiments, by applying structure from motion to separate image sequences the cameras 141-148 may be accurately registered. For example, for each of the cameras 141-148 a three-dimensional rotation matrix $R_c$ is determined. In some embodiments, an additional calibration image from the eye-tracking system 138 viewpoint may be used to calculate the environment registration for the eye-tracking system 138.

Figure 8:
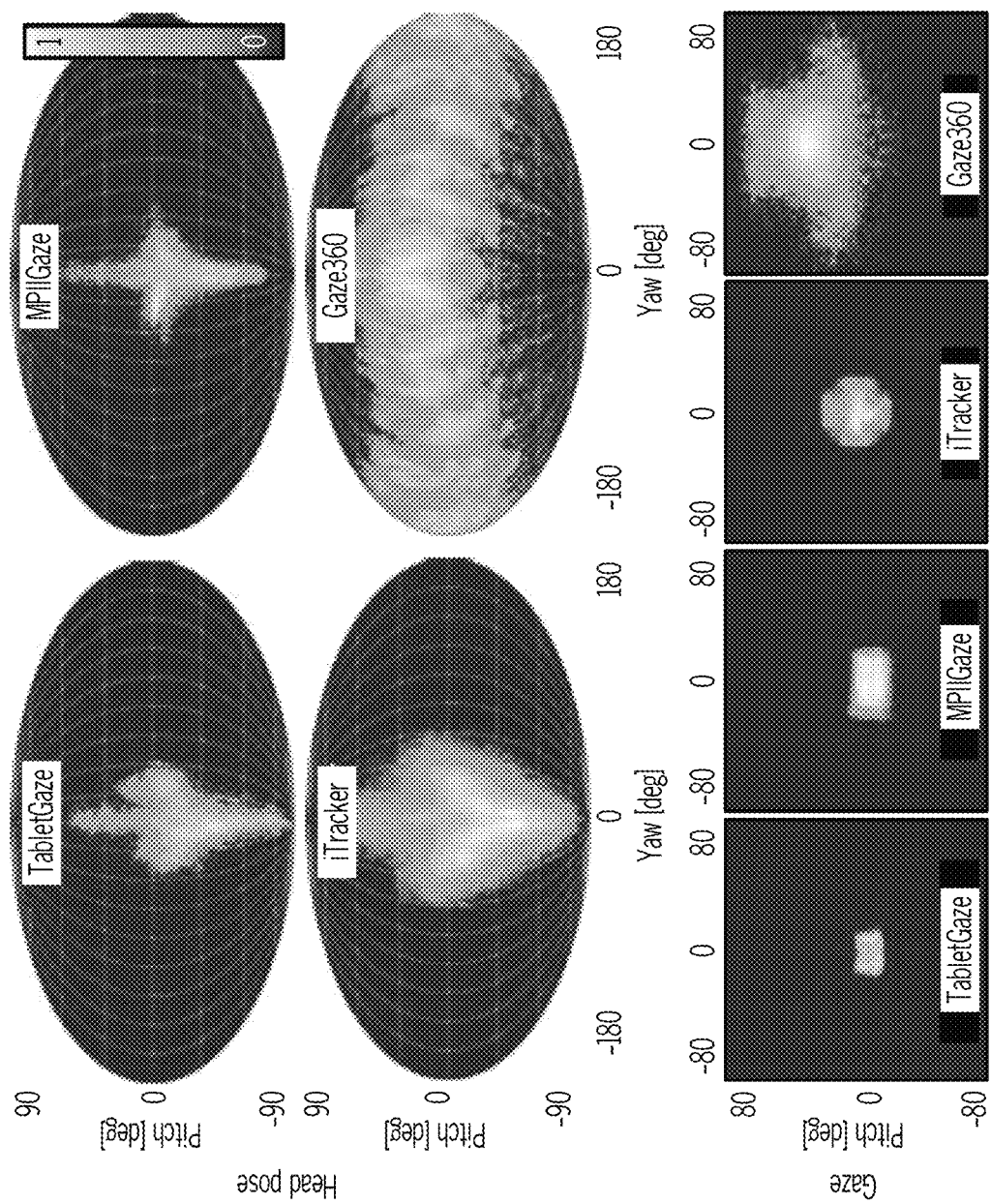
FIG. 8 depicts distribution charts of pitch and yaw angle for head appearance and gaze direction for various gaze detection systems according to one or more embodiments shown and described herein.

Assuming the eye-tracking system 138 is kept fixed for all recordings the eye-tracking gaze direction vector may be projected to each image captured for each of the cameras, c, 141-148 through the following equation: $g_c = R_c \cdot g_0$, to generate a geometrically corrected gaze vector, $g_c$. In embodiments where the image data (e.g., video frames) do not have a valid corresponding eye-tracking gaze direction vector, the image data is discarded. For example, this may include cases of too extreme head appearances relative to the eye-tracking system 138 or when a subject 180 glances away from the display 136. In some embodiments, to complete a 360-degree image dataset from image data of the subject 180 about 180-degrees of head yaw 200 from the face to the rear of the head of a subject 180, the 180-degrees of head yaw 200 image data may be augmented by adding vertically versions of all frames. The augmented gaze vector, $g'_c$, can be calculated by equation: $g'_c = R_a \cdot g_c$, where $R_a$ is a three-dimensional transformation matrix mirroring the vector by a vertical plane orthogonal to the projection plane of the eye-tracking system 138. For example, $R_a = \text{diag}(-1,1,1)$. The effect of the augmentation is depicted in FIG. 8, Gaze360.

Figure 3:
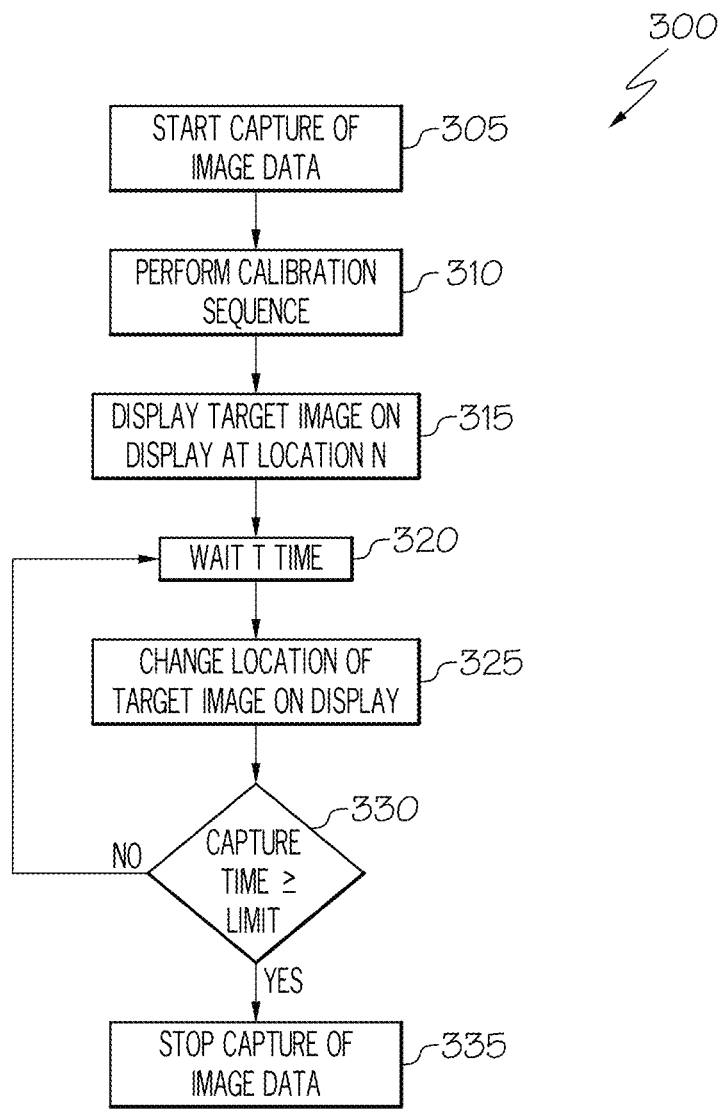
FIG. 3 depicts a flow diagram of a system for generating 3D gaze data for determining the gaze direction of a subject from arbitrary viewpoints according to one or more embodiments shown and described herein.

Referring now to FIG. 3, a flow diagram 300 of an example process 100 for generating the Gaze360 dataset for determining the gaze direction of a subject 180 from arbitrary viewpoints is depicted. In some embodiments, the method depicted in the flow diagram 300 may be executed using the system 100 depicted in FIGS. 2A and 2B. In block 305, the cameras 141-148 start capturing image data. For example, the cameras 141-148 may capture image data at a specified frequency. The frequency may be 1 Hz, 2 Hz, 3 Hz, 4 Hz, 5 Hz, 6 Hz, 7 Hz, 8 Hz, 9 Hz, 10 Hz, 11 Hz, 12 Hz, or other frequency determined from the number of images to be collected during a capture session. For example, for a 3-minute capture session (180 seconds) and a 6 Hz capture frequency, each camera 141-148 will capture about 1080 images. In some embodiments, in block 310, the system 100 preforms a calibration sequence. The calibration sequence may include presenting the subject 180 with several target images 170. For example, 7 or 9 target images 170 at various locations on the display 136. In block 315, the capture sequence is initiated. The capture sequence is initiated by projecting a target image 170 on the display 136 at a location n (e.g., a first location). The target image 170 is projected on the display 136 for a period of time, T, as determined in block 320. For example, the period of time, T, may be about 1 sec, 2 sec, 3 sec, 4 sec, or 5 sec. Other periods of time may be determined by utilized, which provide for sufficient time to collect image data of the subject 180 while viewing the target image 170. In block 325, once the period of time, T, lapses the computing device 130 optionally executing the capture sequence method, the computing device 130 causes the display 136 to change the location of the target image 170 on the display 136 to a location different than the previous location. In block 330, the method determines whether the capture time for the capture sequence has lapsed. For example, if a capture time is defined to be 3 minutes and the location of the target image 170 is changed every 2 seconds, then block 330 will determine whether the capture time has lapsed the defined 3 minutes (or 90 iterations of updating the target image 170 location). If the capture time has not lapsed, then the method will continue to block 320 and again update the target location after the period of time, T, lapses. If the capture time has lapsed, block 335 stops the capture of image data and the capture sequence ends. As a result, a plurality of images are synchronously captured of the subject 180 by the cameras 141-148 from various viewpoints 151-158. Additionally, eye-tracking gaze direction vectors are synchronously captured with the image data.

Figure 4:
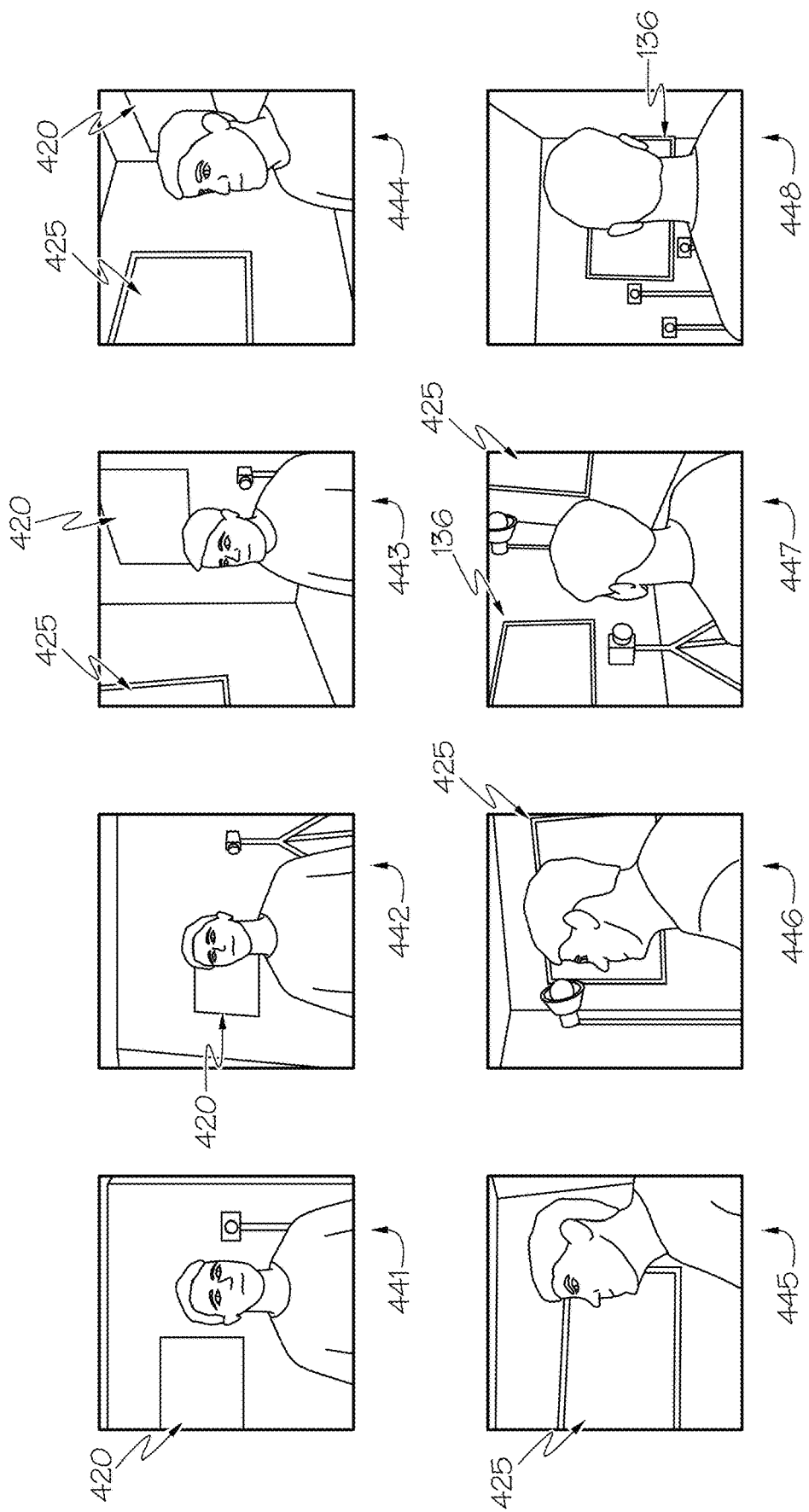
FIG. 4 depicts illustrative line drawings of image data collected from a plurality of cameras in a system for determining the gaze direction of a subject from arbitrary viewpoints according to one or more embodiments shown and described herein.

Referring now to FIG. 4, illustrative line drawings of image data collected from the plurality of cameras 141-148 from arbitrary viewpoints 151-158 are depicted. For example, images 441-448 are line drawing representations of image data captured from the cameras 141-148, respectively. The images 441-448 represent a set of synchronous images from a front facing viewpoint 151 to a rear facing viewpoint 158 about 180-degrees of head yaw 200. As described herein, by capturing sets of synchronous images, the eye-tracking gaze direction vector may be projected to each image 441-448 from each camera 141-148. Additionally, as described herein, the images 441-448 include background objects, for example, a picture 420 in image 441, image 442, image 443, and image 444. For Example, by using SIFT and/or structure from motion algorithms, images 441-444 may be registered with respect to each other based on at least the picture 420. Similarly, the dry erase board 425 in the background of image 443, image 444, image 445, image 446, and image 447, the images 443, and 445-447 may be registered with respect to each other based on at least the dry erase board 425. Additionally, the display 136 may be used to register image 447 with image 448. As a result, each of the images 441-448 may be registered in the environment and the eye-tracking gaze vector may be project onto each image.

Figure 5:
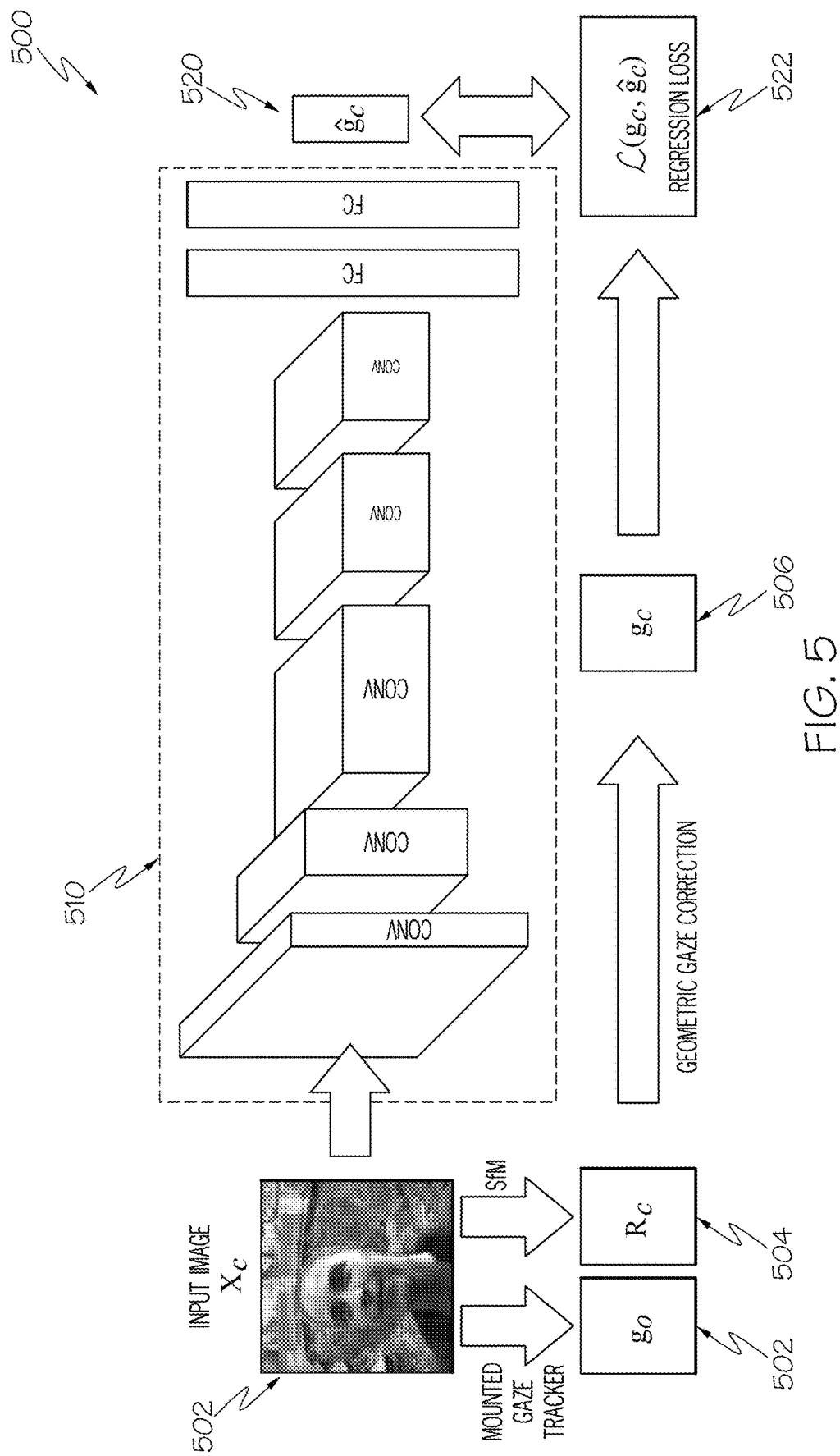
FIG. 5 depicts a flow diagram for training a convolutional neural network for determining the gaze direction of a subject from arbitrary viewpoints according to one or more embodiments shown and described herein.

Referring now to FIG. 5, a flow diagram 500 for training a convolutional neural network 510 to determine the gaze direction of a subject 180 from arbitrary viewpoints is depicted. The convolutional neural network 510 is trained by receiving a plurality of input images 502 from the Gaze360 dataset generated from the multi-camera system 100 described herein. In some embodiments, an input image 502 is input into the convolutional neural network 510 and, in parallel, the input image 502 is spatially registered to generate a geometrically corrected gaze vector, $g_c$, 506. To generate the geometrically corrected gaze vector, $g_c$, 506 the input image 502 may be processed using a structure from motion algorithm to generate a three-dimensional rotation matrix, $R_c$, 504. Then, the geometrically corrected gaze vector 506 is computed using equation: $g_c = R_c \cdot g_0$, where $g_0$ is the eye-tracking gaze direction vector generated by the eye-tracking system 138, described above.

In general, convolutional neural networks are computer implemented models which allow systems to generate responses (i.e., outputs) to an input stimuli (e.g., an input image 502) based on patterns learned from a training dataset. The architecture of convolutional neural networks varies depending on the application. However, they generally include one or more specific types of layers. For example, convolutional neural networks generally include one or more convolution layers, pooling layers, rectified linear units (ReLU), and/or fully connected layers. These are just a few examples of the layers that may form the architecture of a convolutional neural network 510. While other convolutional neural networks may be implemented and trained to achieve the goals set forth in this disclosure, the convolutional neural network 510 depicted in FIG. 5 and described herein comprises an architecture having seven layers: five convolution layers and two fully connected layers where the output is adapted to regress to a three-dimensional gaze vector, $\hat{g}_c$, 520.

The following is intended to provide a brief understanding of convolutional neural networks and not intended to limit the disclosure herein. Variations and improvements to the architecture and operation of the convolutional neural network 510 may be possible without departing from the scope of the disclosure and the claims herein. In general, when a convolutional neural network 510 is presented with a new image, the convolutional neural network 510 compares pieces of the image with learned image features of a particular result. That is, features match common aspects of the images. Since the convolutional neural network does not know where these features will match it tries them everywhere, in every possibly position. In calculating the match to a feature across the whole image, a filter is created. The math used to perform the matching is called convolution. To calculate the match of a feature to a patch (i.e., a defined number of pixels×pixels in the two-dimensional image) of the image, each value assigned to each pixel in the feature is multiplied by the corresponding pixel in the patch of the image. The answers are then added up and divided by the number of pixels in the feature. To complete the convolution, the process is repeated lining up the feature with every possible image patch. The answers from each convolution may be placed in a new two-dimensional array based on where in the image each patch is located. This map of matches is also a filtered version of the input image 502. It is a map of where in the image the feature is found. The next step would be to complete the convolution for each of the other features. The results being a set of filtered images, one for each of the filters.

Another tool used in convolutional neural networks is pooling. Pooling is a method of taking large images and reducing them while preserving important information. For example, a window is defined in pixel dimensions. The window may be stepped across the image and the maximum value from the window at each step is extracted and placed in an array corresponding to its location in the original image.

Another tool used in convolutional neural network is referred to as rectified linear units (ReLU). An ReLU simply swaps any negative value in an array to a zero to prevent the math within a convolutional neural network from failing as a result of a negative value. By combining these tools into layers, the basic architecture of a convolutional neural network may be formed. However, another tool may be implemented, a fully connected layer. Fully connected layers, generally, take high-level filtered images and translate them into votes. Instead of treating inputs as two-dimensional arrays, such as those input and output from the previously discussed layers, fully connected layers convert each value of an array into a single list. Every value independently votes on whether the input image 502 is one of a set of results. While every value independently votes, some values are better than others at knowing when an input image 502 is a particular result. In turn, these values get larger votes, which may be expressed as weights or connection strengths between each value and each category. When a new image is presented to the convolutional neural network, it percolates through the lower layers until it reaches the fully connected layer. An election is held and the answer with the most votes wins and is declared the category of the input. For example, in the embodiments herein, the category is defining a gaze direction vector.

Although each of the aforementioned tools may be configured together to form layers to analyze an image, the learning for a convolutional neural network occurs through the implementation of backpropagation. In other words, backpropagation is a method for which a convolutional neural network achieves learning. Using a collection of images (e.g., the Gaze360 dataset), where the answers (i.e., the gaze direction vector) are known (e.g., by generating a geometrically corrected gaze vector 506 based on the eye-tracking gaze direction vector), an error between the known answer and the result generated by the convolutional neural network may be generated. The amount of wrongness in the vote, the error, indicates whether the selected features and weights are accurate. From there the features and weights may be adjusted to make the error less. Each value is adjusted a little higher or a little lower, and a new error is computed. Whichever adjustment makes the error less is kept. After iterating through each of the feature pixels in every convolution layer and every weight in each of the fully connected layers, the new weights give an answer that works slightly better for that image. This is repeated with each subsequent image in the set of labeled images (e.g., each image in the Gaze360 dataset). As more and more images are fed through the convolutional neural network 510, patterns begin to arise and stabilize the predicted answer for a given input image 502.

Referring back to FIG. 5, the convolutional neural network 510 is configured to receive an input image 502 and provide a predicted three-dimensional gaze vector, $\hat{g}_c$, 520. In some embodiments, the output 520 of the convolutional neural network 510 is a triplet of angles, one for each axis of $\mathbb{R}^3$. This may be regressed using an $L_2$ loss and the loss over the three different angles is averaged. In some embodiments, the convolutional neural network 510 may be an adapted version of the convolutional neural network 510 described in "ImageNet Classification with Deep Convolutional Neural Networks," by Krizhevsky et al.

In some embodiments, training of the convolutional neural network 510 may become biased because the background of the input images 502 share a generalized appearance (e.g., a laboratory). To address this the background of an input image 502 that is input into the convolutional neural network 510 may be replaced with a random scene, for example from the Places Dataset, defined in "Learning deep features for scene recognition using places database," by Zhou et al. For example, during training, semantic segmentation is used to mask a generalized laboratory background with a random scene.

In some embodiments, while the Gaze360 dataset provides a rich source of data for learning a 3D gaze of a subject 180 from monocular images, it is not necessarily feasible to obtain 3D gaze information from arbitrary images in general scenes. For example, everyday situations such as police officers wearing caps or construction workers wearing helmets may not readily be included in laboratory-generated datasets. However, the convolutional neural network 510 may still learn such everyday situations by training the convolutional neural network 510 with both the Gaze360 dataset and 2D images. In such embodiments, the regular $L_2$ loss is computed for samples from the 3D dataset and for the 2D images, the output vector, $\hat{g}_c$, 520 is projected into the image to $\hat{g}_\pi = \pi(\hat{g}_c)$ and the angular loss is computed in the image space.

Figure 6:
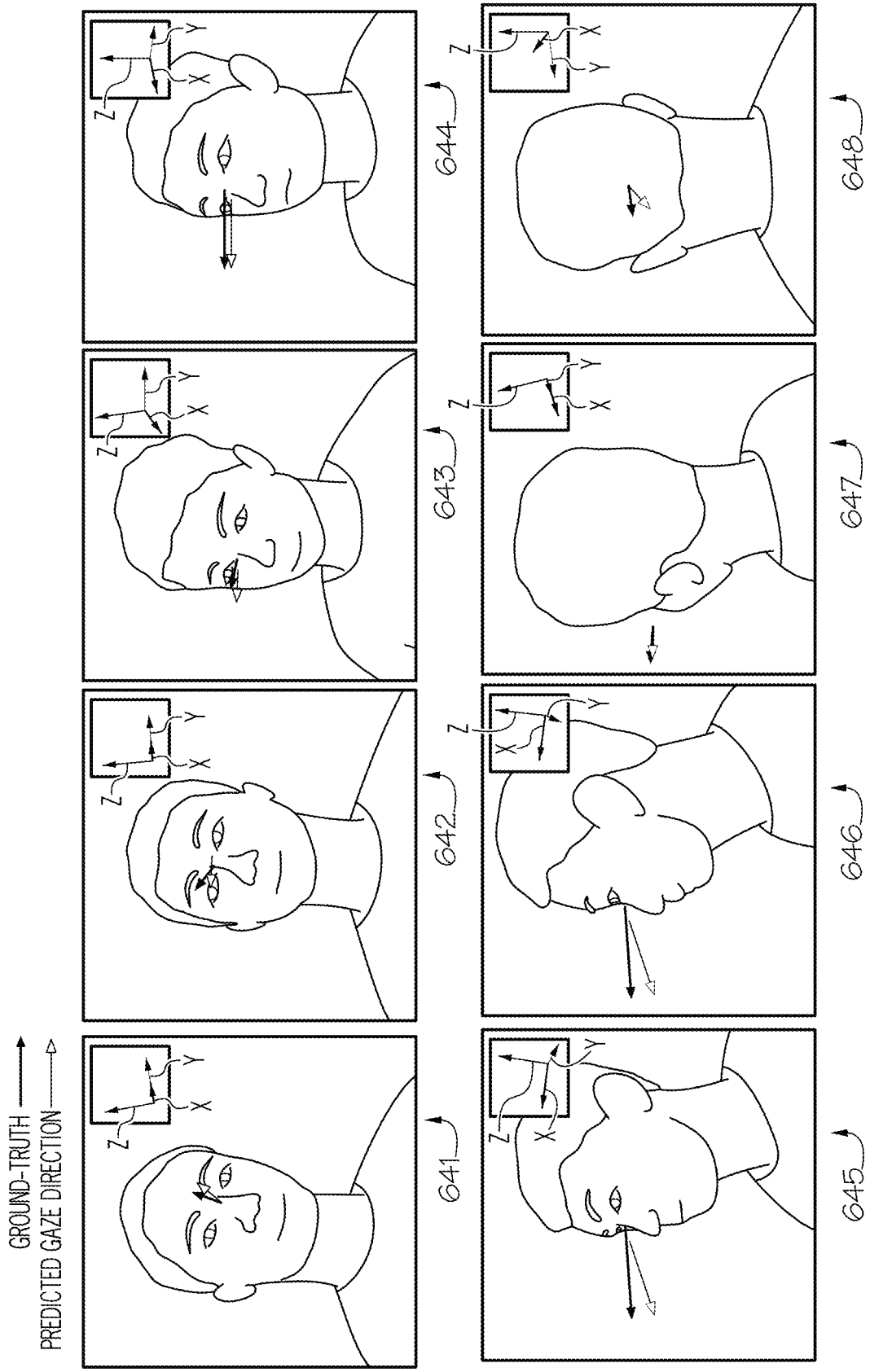
FIG. 6 depicts illustrative line drawings of outputs from the training of the convolutional neural network for determining the gaze direction of a subject from arbitrary viewpoints according to one or more embodiments shown and described herein.

Referring now to FIG. 6, illustrative line drawings representing the outputs from the training of the convolutional neural network 510 are depicted. Each of the images 641-648 are from the same instance in time captured by each of the eight cameras 141-148, respectively. Each of the images 641-648 have been annotated with the ground-truth (i.e., the eye-tracking gaze direction vector) and the predicted gaze direction vector from the convolutional neural network 510. Additionally, the estimated head appearance is illustrated in the upper right corner of the each image. While the output of the system may only comprise a predicted gaze direction vector, FIG. 6, illustrates a compilation of the elements described herein.

Experimental Evaluation and Benchmarking

Figure 7:
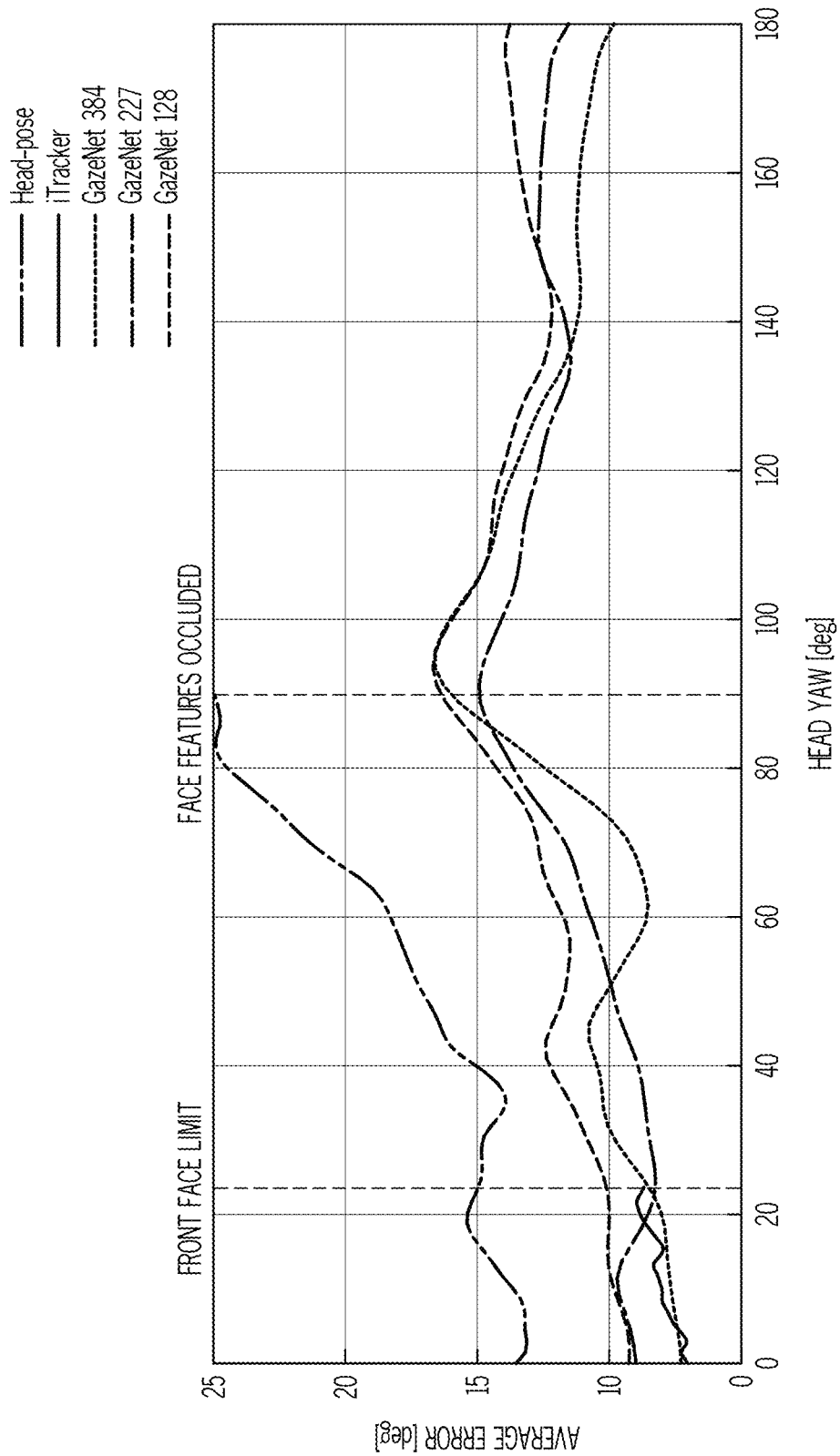
FIG. 7 depicts a chart comparing the average error across degrees of head yaw in head appearance and iTracker systems with systems for determining the gaze direction of a subject from arbitrary viewpoints and according to one or more embodiments shown and described herein.
Figure 9:
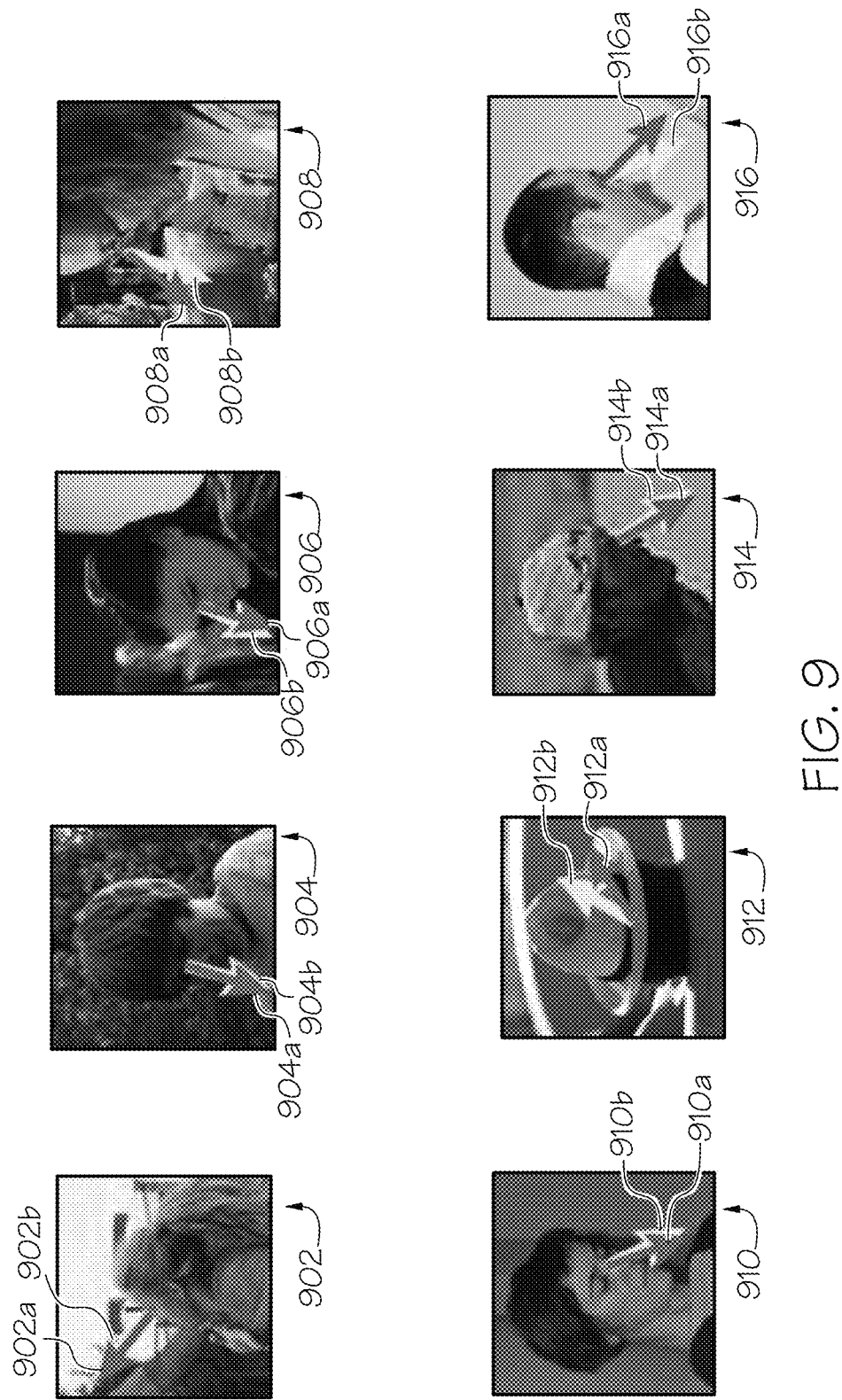
FIG. 9 depicts a plurality of GazeNet predictions on the GazeFollow dataset images according to one or more embodiments shown and described herein.

Referring to FIGS. 7-9, experimental results are presented for the evaluation of a convolutional neural network model (referred to herein as "the GazeNet model") trained with the Gaze360 dataset. The GazeNet model was trained with three different image input sizes (in pixels), 128×128, 227×227, and 384×384, in order to explore performance variation with resolution. While specific image sizes were explored through the experimentation discussed herein, embodiments are not limited to such image sizes. Each of the GazeNet models were trained with subjects who do not appear in the test set. To quantify performance, angular error was computed, as described in "A Review and Analysis of Eye-Gaze Estimation Systems, Algorithms, and Performance Evaluation Methods in Consumer Platforms," by Kar et al. The angular error maybe computed as the angle between the predicted gaze direction vector and the eye-tracking gaze direction vector, by taking the arccosine of the dot product between the normalized vectors.

In addition to evaluating the performance of the GazeNet model with different sized input images, comparisons were also made against available baselines, iTracker and Head Pose. iTracker is a high performing model for gaze tracking with visible face and eyes. The iTracker model was trained and evaluated using only the front-facing camera (e.g., camera 141, FIG. 2A) where both eyes are visible. Head Pose is a head pose estimation model taking the head orientation as an estimate for gaze angle. The method was executed on images where face detection is possible, since this is necessary for the method to work. To account for the mutual relationship between head and gaze, the model was optimized for an additional rotation bias and reported the lower bound of the resulting error.

Table 1, below, shows the performance of GazeNet on the Gaze360 dataset for different input resolutions, along with three baselines. More specifically, Table 1 reports the mean angular errors for the various sized GazeNet models and the benchmarks on difference subsets of the Gaze360 test data. The table also shows the error for different ranges of yaw angle: across all possible angles, for the front-facing hemisphere, and for only the front-facing camera (e.g., camera 141, FIG. 2A).

TABLE 1

| Model | 360° (All cameras) | | | Frontal 180° Image Resolution | | | Front-Facing | | |
|---|---|---|---|---|---|---|---|---|---|
| | 384 | 227 | 128 | 384 | 227 | 128 | 384 | 227 | 128 |
| GazeNet | 10.5° | 10.9° | 12.2° | 8.8° | 9.3° | 10.5° | 6.6° | 8.0° | 8.9° |
| Head Pose | | N/A | | | 15.2° | | | 13.6° | |

TABLE 1-continued

| Model | 360° (All cameras) | | | Frontal 180° Image Resolution | | | Front-Facing | | |
|---|---|---|---|---|---|---|---|---|---|
| | 384 | 227 | 128 | 384 | 227 | 128 | 384 | 227 | 128 |
| iTracker | | N/A | | | N/A | | | 8.0° | |
| Camera Mean | | 76.5° | | | 31.2° | | | 8.8° | |

It is noted that both of the baselines are restricted to particular yaw angles. iTracker is designed to work only with front-facing data and the Head Pose method relied on the detection of facial features.

GazeNet outperforms all baselines across all the subsets of yaw angles. iTracker performs worse than the high resolution version of GazeNet for the front-facing camera (e.g., camera 141, FIG. 2A), despite being designed for this setting and having access to a separate input stream of enlarged eye images as well as a face image. GazeNet also outperforms the Head Pose baseline, which is notably worse than taking a camera mean for the front-facing camera (e.g., camera 141, FIG. 2A). The correlation between the gaze and head appearance is lower in our dataset as we instructed our participants to freely move their head while forcing them to independently gaze at a given location on screen. When the eyes are visible, the GazeNet method not only looks to head appearance to produce its outputs, but also uses the eye appearance to predict where the person is looking more accurately.

Finally, the higher the image resolution, the better the GazeNet model performs. For the front-facing camera (e.g., camera 141, FIG. 2A) where face features are highly used, the high resolution version of the model performs significantly better than the low resolution versions.

In FIG. 7, a plot of the performance of the three different sized GazeNet models and the baselines according to the yaw angle is depicted. The error grows when the head angles increase and as the facial features are less visible from the camera. Furthermore, it is shown that all the GazeNet models find it easier to predict the gaze location from the back than from the side, probably because of the better perspective of the head appearance for predicting gaze yaw.

Referring to FIG. 8, distribution charts of pitch and yaw angle for head appearance and gaze direction for various gaze detection systems is depicted. The GazeNet model is compared with methods able to predict gaze using face features such as the face or eye detections. The GazeNet model achieves a range of performance more diverse than other methods such as TabletGaze, MPIIGaze, and iTracker. Each of these models are significantly limited in the degree of head yaw the system can receive to generate a predicted gaze direction. Furthermore, although the range of pitch appears to be comparable to some other methods this is likely a function of the collected data not including a wider range of pitch. Therefore, the GazeNet model should be capable of preforming over a larger range of pitch if the Gaze360 data included additional variations in height of the cameras (e.g., cameras 141-148, FIG. 2A) (i.e., pitch) during the collection process.

Referring now to FIG. 9, a plurality of GazeFollow dataset images with predicted gaze directions generated from the GazeNet model are depicted. The GazeFollow dataset is composed of images from multiple Internet-sourced computer vision datasets and is annotated with 2D gaze information. The GazeNet model was trained on both the GazeFollow dataset (2D) and the Gaze360 dataset (3D) together. Table 2 presents the evaluation of the method on the GazeFollow test set, along with four baselines and human performance on the task. The baselines are Gaze-Follow (no context), GazeFollow (with context), Fixed Bias, and Chance. GazeFollow (no context) takes the gaze pathway of the GazeFollow network introduced by computing the gaze distribution using the person's head and his location in the image. GazeFollow (with context) makes use of the position of salient objects in the rest of the image. Fixed Bias is a method that is indicative of the relevance of the subject's location in the image for the final prediction. The image is split into an 11×11 grid, and for each element of the grid the average gaze direction is computed. At test time, the system outputs the average gaze for the location of the person in the image. Chance/Random outputs a random unit vector as a prediction.

TABLE 2

| Model | Avg. Error |
|---|---|
| Human performance | 11° |
| Fixed Bias | 48° |
| Random | 69° |
| GazeFollow (with context) | 24° |
| GazeFollow (no context) | 34° |
| GazeNet (no context) | 27° |

Table 2 shows how the adapted training made GazeNet model work in a dataset as diverse as GazeFollow. The GazeNet model outperforms the gaze pathway in the Gaze-Follow network, which is computing gaze direction. Furthermore, the GazeNet model's performance is comparable to the full method even though the GazeNet model does not use information about the person's location in the image or the full image itself, which can sometimes be informative about the gaze direction.

Still referring to FIG. 9, the images 902-916 include a plot of the ground truth gazes (902a, 904a, 906a, 908a, 910a, 912a, 914a, and 916a) and the predictions from the GazeNet model (902b, 904b, 906b, 908b, 910b, 912b, 914b, and 916b) on images 902-916, respectively, sampled from the GazeFollow test set. The GazeNet model generalizes very well to a variety of situations, such as persons in costume or wearing caps. In ambiguous situations where context is very informative about the gaze direction (as in image 908), GazeNet returns a reasonable guess. To summarize, the adapted training to a mixture of 2D GazeFollow and 3D Gaze360 data helps GazeNet work in a diverse variety of situations. The GazeNet model outperforms previous state-of-the-art models in similar conditions (with only access to the head image) and shows comparable performance with methods that use more information (such as a subject's position in an image).

It should now be understood that embodiments described herein are directed to systems and methods for determining gaze direction of a subject from arbitrary viewpoints. The system generally includes a computing device having a processor and a non-transitory computer-readable memory communicatively coupled to one or more cameras positioned to capture the head appearance and/or eyes of a subject. The computing device may predict a gaze direction vector from the image data captured by the one or more cameras using a convolutional neural network trained on a 360-degree, Gaze360, dataset. The Gaze360 dataset may be developed from a multi-camera arrangement where each camera captures a different viewpoint of the subject about at least a 180-degrees of head yaw from the face to the rear of the head of the subject. The cameras are synchronized to capture image data of the subject as a display, which may also be communicatively coupled to the computing device, projects a target image on the display for the subject to gaze at. In some embodiments, an eye-tracking system may be implemented at a front-facing viewpoint to generate an eye-tracking gaze direction vector of the subject in sync with the cameras. The eye-tracking gaze direction vector may be projected onto the image data collected from each camera for training the convolutional neural network. Once trained the convolutional neural network may receive an input image from a camera and generate a predicted gaze direction vector.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a camera positioned in an environment to capture image data of a head of a subject;
   a computing device communicatively coupled to the camera, the computing device comprising a processor and a non-transitory computer-readable memory; and
   a machine-readable instruction set stored in the non-transitory computer-readable memory that causes the computing device to perform at least the following when executed by the processor:
     receive the image data from the camera;
     analyze the image data captured by the camera using a convolutional neural network trained on an image dataset comprising images of the different orientations of the head of the subject captured from viewpoints distributed from a front facing viewpoint of the subject to a rear facing viewpoint of the subject in response to a target image presented to the subject at different locations such that the orientation of the head of the subject changes and a gaze of the subject is drawn to the different locations; and
     predict, with the convolution neural network, a gaze direction vector of the subject wherein when an eye or eyes of the subject are captured in the image data by the camera the prediction is based upon a combination of a head appearance and an eye appearance from the image dataset, and when the eyes are occluded in the image data, the prediction is based upon the head appearance.

2. The system of claim 1, wherein the image dataset comprises images of the head of the subject captured from viewpoints distributed around up to 360-degrees of head yaw, up to 180-degrees of head pitch, and up to 180-degrees of head roll.

3. The system of claim 1, wherein the convolutional neural network comprises one or more convolution layers and one or more fully connected layers.

4. The system of claim 1, wherein the image data received by the processor comprises an image size of at least one of the following: 128×128, 227×227, and 384×384.

5. The system of claim 1, wherein the image data is a 3D image.

6. The system of claim 1, wherein the image data is a 2D image.

7. The system of claim 1, wherein the predicted gaze direction vector comprises a three-dimensional gaze vector.

8. A system comprising:
   an eye-tracker positioned at a front facing viewpoint, wherein the eye-tracker captures eye-tracking image data of an eye of a subject;
   a display positioned to project a target image to the subject;
   a plurality of cameras positioned to capture image data of a head of the subject, wherein the image data comprises a set of synchronized images from the front facing viewpoint of the subject to a rear facing viewpoint of the subject about 180-degrees of head yaw;
   a computing device communicatively coupled to the plurality of cameras, the computing device comprising a processor and a non-transitory computer-readable memory;
   a machine-readable instruction set stored in the non-transitory computer-readable memory that causes the system to perform at least the following when executed by the processor:
     project the target image at a first location on the display;
     synchronously capture image data of an orientation of the head of the subject from the plurality of cameras and the eye-tracking image data from the eye-tracker in response to the projected target image;
     periodically adjust the location of the target image on the display, such that the orientation of the head of the subject changes and a gaze of the subject is drawn to a different location than the first location on the display;
     determine an eye-tracker gaze direction vector of the subject from the eye-tracking image data; and
     store the image data of an orientation of the head of the subject from the plurality of cameras and the eye-tracking image data from the eye-tracker in the non-transitory computer-readable memory, thereby forming an image dataset comprising images of the head of the subject from the front facing viewpoint to the rear facing viewpoint about at least 180-degrees of head yaw annotated with the eye-tracker gaze direction vector.

9. The system of claim 8, wherein periodically adjusting the location of the target image on the display comprises adjusting the location of the target image every two seconds.

10. The system of claim 8, wherein the plurality of cameras are positioned at varying heights such that a pitch angle of one or more cameras of the plurality of cameras comprises an upward pitch or downward with respect to the head of the subject.

11. The system of claim 8, wherein the plurality of cameras are positioned to capture image data of the subject about 360-degrees of head yaw.

12. The system of claim 8, wherein the plurality of cameras comprises eight cameras.

13. The system of claim 8, wherein the machine-readable instruction set stored in the non-transitory computer-readable memory further causes the system to perform the following when executed by the processor:
   determine a three-dimensional rotation matrix for each camera of the plurality of cameras; and
   project the eye-tracker gaze direction vector on each camera of the plurality of cameras using the three-dimensional rotation matrix to generate a geometric gaze correction vector.

14. The system of claim 13, wherein the machine-readable instruction set stored in the non-transitory computer-readable memory further causes the system to perform the following when executed by the processor:
   input an image from the image dataset into a convolutional neural network;
   analyze the image data captured by the camera using the convolutional neural network;
   predict a gaze direction vector of the subject with the convolutional neural network wherein when an eye or eyes of the subject are captured in the image data by the camera, the prediction is based upon a combination of a head appearance and eye appearance from the image dataset, and when the eyes are occluded in the image data, the prediction is based upon the head appearance;
   compute an error between the geometric gaze correction vector and the predicted gaze direction vector; and
   update one or more features or weights of the convolutional neural network such that the error is reduced.

15. The system of claim 14, wherein when the processor computes the error, the processor computes an $L_2$ loss.

16. A method comprising:
   obtaining training data for training a convolutional neural network comprising:
      displaying a target image at a first location on a display positioned in front of a subject;
      synchronously capturing image data of the subject from a plurality of cameras positioned to capture image data of an orientation of a head of the subject from a front facing viewpoint of the subject to a rear facing viewpoint of the subject about 180-degrees of head yaw and eye-tracking image data from an eye-tracker in response to the displayed target image;
      periodically adjusting the location of the target image on the display, such that the position of the head of the subject changes and a gaze of the subject is drawn to a different location than the first location on the display;
      determining an eye-tracker gaze direction vector of the subject from the eye-tracking image data; and
      storing the image data of an orientation of the head of the subject from the plurality of cameras and the eye-tracking image data from the eye-tracker in a non-transitory computer-readable memory thereby forming an image dataset comprising images of the head of the subject from the front facing viewpoint to the rear facing viewpoint about at least 180-degrees of head yaw annotated with the eye-tracker gaze direction vector.

17. The method of claim 16, wherein periodically adjusting the location of the target image on the display comprises adjusting the location of the target image every two seconds.

18. The method of claim 16, wherein the plurality of cameras are positioned to capture image data of the subject about 360-degrees of head yaw.

19. The method of claim 16, further comprising training the convolutional neural network comprising:
   inputting an image from the image dataset stored in the non-transitory computer-readable memory into the convolutional neural network;
   analyzing the image using the convolutional neural network;
   predicting a gaze direction vector of the subject with the convolutional neural network wherein when an eye or eyes of the subject are captured in the image, the prediction is based upon a combination of a head appearance and eye appearance from the image dataset, and when the eyes are occluded in the image data, the prediction is based upon the head appearance from the image dataset;
   determining a three-dimensional rotation matrix for each camera of the plurality of cameras;
   projecting the eye-tracker gaze direction vector on each camera of the plurality of cameras using the three-dimensional rotation matrix to generate a geometric gaze correction vector;
   computing an error between the geometric gaze correction vector and the predicted gaze direction vector; and
   updating one or more features or weights of the convolutional neural network such that the error is reduced.

20. The method of claim 19, wherein computing the error includes computing an $L_2$ loss.

* * * * *

UNITED STATES PATENT AND TRADEMARK OFFICE
CERTIFICATE OF CORRECTION

PATENT NO. : 11,042,994 B2
APPLICATION NO. : 16/158831
DATED : June 22, 2021
INVENTOR(S) : Simon Stent et al.

Page 1 of 1

It is certified that error appears in the above-identified patent and that said Letters Patent is hereby corrected as shown below:

On the Title Page

Item (73), assignee 2, insert --Massachusetts Institute of Technology, Cambridge, MA (US)-- following "TOYOTA RESEARCH INSTITUTE, INC., Los Altos, CA (US)".

Signed and Sealed this
Second Day of August, 2022

Katherine Kelly Vidal
*Director of the United States Patent and Trademark Office*